J. W. A. McGILVREY.
AUTOMATIC TEETH CLEANING ATTACHMENT FOR MANURE SPREADER CYLINDERS.
APPLICATION FILED AUG. 14, 1916.
1,227,919. Patented May 29, 1917.
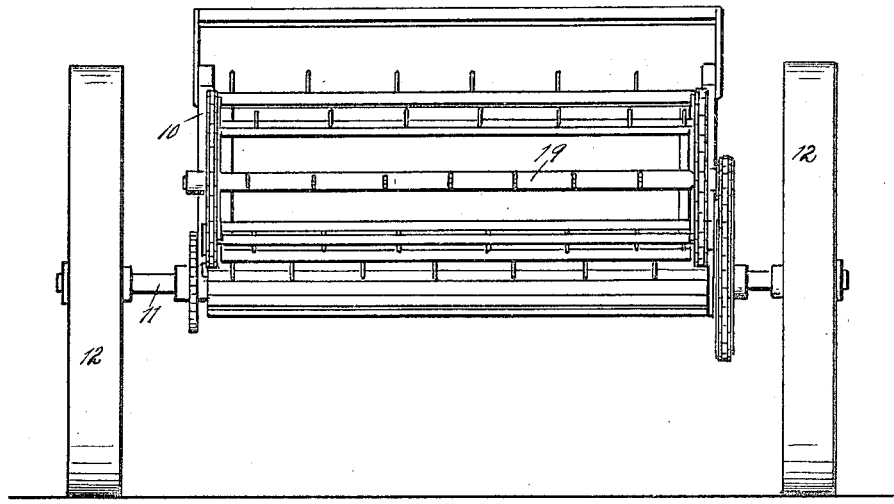
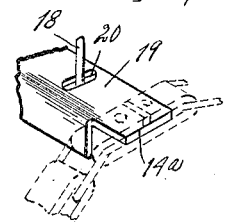
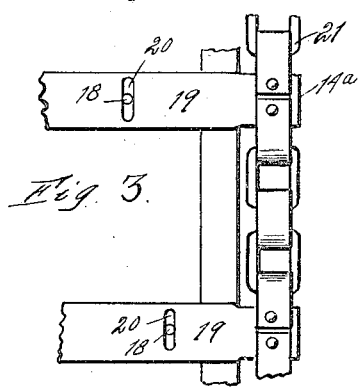
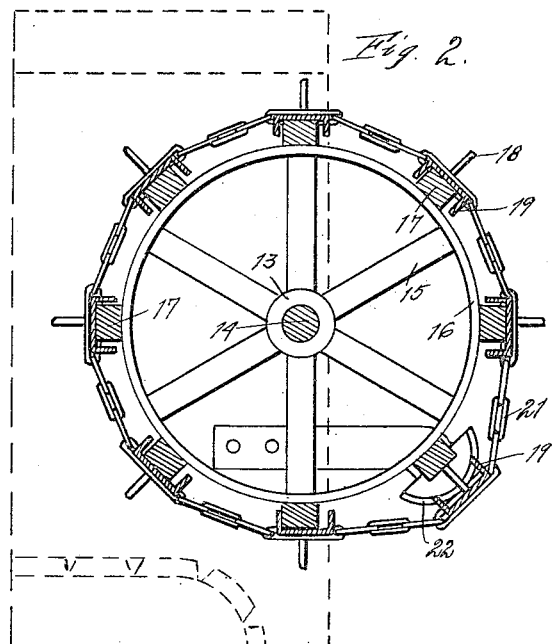

UNITED STATES PATENT OFFICE.

JOHN W. A. McGILVREY, OF ALBIA, IOWA, ASSIGNOR OF ONE-HALF TO GEORGE W. MILLER, OF ALBIA, IOWA.

AUTOMATIC TEETH-CLEANING ATTACHMENT FOR MANURE-SPREADER CYLINDERS.

1,227,919.     Specification of Letters Patent.     Patented May 29, 1917.

Application filed August 14, 1916. Serial No. 114,911.

*To all whom it may concern:*

Be it known that I, J. W. A. McGILVREY, a citizen of the United States, and resident of Albia, in the county of Monroe and State of Iowa, have invented a certain new and useful Automatic Teeth-Cleaning Attachment for Manure-Spreader Cylinders, of which the following is a specification.

The object of my invention is to provide a mechanism of simple, durable and inexpensive construction, to be used on manure spreaders for automatically cleaning the teeth of the spreader cylinder.

A further object is to provide such a device adapted to be mounted on the machine and to operate when the spreader cylinder is rotated for automatically cleaning the teeth thereof on each revolution of the cylinder.

My invention consists in the construction and arrangement of the parts of the device, whereby the foregoing and other objects are attained as set forth in the following specification and claims and illustrated in my drawings in which:

Figure 1 shows a rear elevation of a manure spreader equipped with a teeth cleaning attachment for the cylinder, embodying my invention.

Fig. 2 shows a vertical central sectional view of the spreader cylinder with my attachment thereon taken at right angles to the view shown in Fig. 1.

Fig. 3 shows an enlarged detail view of a portion of the attachment, and

Fig. 4 shows a perspective view of the end of one of the channel shaped members.

In the form of my invention illustrated in the accompanying drawings, I have used the reference numeral 10 to indicate generally the frame of a manure spreader having the rear axle 11 on which are the wheels 12. Suitably mounted at the rear upper end of the manure spreader is a cylinder which may be made in any suitable form, but as shown herein, comprises a pair of spaced hubs 13 mounted upon a transverse shaft 14. The hubs 13 have radially extending spokes 15 at the outer ends of which are rims 16. The hubs 13 are located near the opposite ends of the shaft 14. Connecting the opposite rims 16, is a plurality of parallel spaced bars 17, in which are mounted the teeth 18. Resting upon each bar 17 is an inwardly opening channel 19, which receives the bar 17 and is wider than the bar 17, as shown in Fig. 2, to allow play of the channels 19 on the bars 17. Each channel 19 has in its central portion a plurality of transverse elongated slots 20 through which the teeth 18 are extended as shown in Figs. 1, 3 and 4.

The central portions of the channels 19, project beyond the side flanges, thereof, at the ends of said channels as shown in channels 3 and 4 at 14ª. At each end of the cylinder the projecting portions 14ª are secured to an endless chain 21. Suitably mounted on the frame of the machine and arranged in the paths of travel of the respective chains 21, are curved guide devices 22. The guide devices are so located outside the extended outlines of the cylinder as to draw the channels 19 outwardly away from the axle 14, and the bars 17, as shown in Fig. 2, when the ends of the respective channels pass over said guides. When the channels are thus moved outwardly away from the bars 17, it will be obvious that any straw or other material which may have collected upon the teeth 18, will be scraped off said teeth, the parts being so arranged that the channels move outwardly when passing the guides 22 to a sufficient distance to properly clean the teeth.

It will be noted that sufficient play of the channels on the bars 17, and on the teeth 18, is permitted to allow the proper movement of the channels for affecting the cleaning operation.

It is well known that in the use of a manure spreader, material tends to collect on the teeth until the cylinder becomes clogged or the teeth are so embedded in matter that they do not properly drag the material from the load for spreading it. This difficulty is avoided by my cleaning device.

Some changes may be made in the construction and arrangement of the various parts of my device without departing from the essential features and purposes thereof, and it is my intention to cover by my present application, any such modified forms of construction and any use of mechanical equivalent which may come within the reasonable scope of my claims.

I claim as my invention:

1. In a device of the class described, the combination of a spreader cylinder, having a plurality of longitudinally arranged spaced supporting members, each provided with outwardly extending teeth, inwardly opening channels mounted on each supporting member capable of sliding inwardly and outwardly thereon, said channels being wider than said supporting members and being provided with slots elongated circumferentially of the cylinder for receiving said teeth, flexible members connecting the ends of said channels, a guide device whereby said channels are moved outwardly out of a true circle from one point of their line of travel when the cylinder is rotated, whereby said channels serve to clean said teeth.

2. In a device of the class described, a manure spreader cylinder having a plurality of longitudinally arranged circumferentially spaced supporting members having outwardly extending teeth, inwardly opening channels of greater width than said supporting members mounted thereon, provided with circumferentially elongated slots for receiving said teeth, the central portions of said channels being extended at their ends, flexible members connecting the extending ends of the channels at the opposite ends of the spreader cylinder, and guide devices arranged in the path of travel of said extending end for causing said channels to move outwardly out of a true circle at one point in their line of travel when said cylinder is rotated for causing said channels to clean said teeth.

Des Moines, Iowa, July 1, 1916.

JOHN W. A. McGILVREY.

Copies of this patent may be obtained for five cents each, by addressing the "Commissioner of Patents, Washington, D. C."